(12) United States Patent
Koji et al.

(10) Patent No.: US 7,726,701 B2
(45) Date of Patent: Jun. 1, 2010

(54) CONNECTING MECHANISM FOR THIN STAINLESS STEEL PIPE AND JOINT

(75) Inventors: Ohara Koji, Okayama (JP); Tsuneto Kazuharu, Okayama (JP)

(73) Assignee: O.N. Industries Co., Ltd. (JP)

( * ) Notice: Subject to any disclaimer, the term of this patent is extended or adjusted under 35 U.S.C. 154(b) by 0 days.

(21) Appl. No.: 12/212,747

(22) Filed: Sep. 18, 2008

(65) Prior Publication Data
US 2009/0102190 A1    Apr. 23, 2009

Related U.S. Application Data

(63) Continuation of application No. PCT/JP2007/070485, filed on Oct. 19, 2007.

(51) Int. Cl.
*F16L 19/00* (2006.01)
*F16L 55/00* (2006.01)
(52) U.S. Cl. .................... 285/354; 285/14; 285/93; 285/339
(58) Field of Classification Search ........... 285/113, 285/232, 339, 354, 13, 14, 93
See application file for complete search history.

(56) References Cited

U.S. PATENT DOCUMENTS

| 771,682 | A | * | 10/1904 | Sussman | 285/331 |
| 1,058,542 | A | * | 4/1913 | Brown | 285/332.4 |
| 1,664,125 | A | * | 3/1928 | Lowrey | 285/13 |
| 1,782,737 | A | * | 11/1930 | Mahon | 285/123.7 |
| 2,082,164 | A | * | 6/1937 | Sebastian | 285/14 |
| 2,323,099 | A | * | 6/1943 | Walter | 285/14 |
| 2,448,888 | A | * | 9/1948 | Hynes | 285/232 |
| 2,453,391 | A | * | 11/1948 | Whittingham | 285/14 |
| 2,685,461 | A | * | 8/1954 | Mueller | 285/332.2 |
| 3,258,279 | A | * | 6/1966 | Johnsen | 285/110 |

(Continued)

FOREIGN PATENT DOCUMENTS

JP        01199089 A   *   8/1989

(Continued)

OTHER PUBLICATIONS

English Translation of Japanese Utility Model Publication No. 2-37015.

*Primary Examiner*—James M Hewitt
(74) *Attorney, Agent, or Firm*—Thomas, Kayden, Horstemeyer & Risley, LLP

(57) ABSTRACT

A connecting mechanism for a thin stainless steel pipe and a joint includes a thin stainless steel pipe in which a chevron type projection portion is formed in an outer periphery of an end portion, a joint having an inner diameter inserting the thin stainless steel pipe and forming a male thread portion in an outer peripheral surface of an end portion, a nut having a fitting portion outwardly fitted to the thin stainless steel pipe so as to oppose to the joint on the boundary of the chevron type projection portion and having a female thread portion screwed to the male thread portion of the joint, and a packing provided between the joint and the thin stainless steel pipe wherein, a release groove is formed in a packing outer peripheral contact surface from the packing pressing surface constructing the inner side surface of the packing fitting portion of the joint to an opening end portion.

2 Claims, 11 Drawing Sheets

U.S. PATENT DOCUMENTS

| | | | |
|---|---|---|---|
| 3,288,494 A * | 11/1966 | Callahan, Jr. et al. | 285/14 |
| 3,393,930 A * | 7/1968 | Ziherl et al. | 285/334.4 |
| 3,584,900 A * | 6/1971 | Lennon et al. | 285/14 |
| 3,807,773 A * | 4/1974 | Heinz | 285/52 |
| 4,919,455 A * | 4/1990 | Nakamura | 285/23 |
| 5,529,349 A * | 6/1996 | Gibbs et al. | 285/332 |
| 5,893,591 A * | 4/1999 | Ebel et al. | 285/354 |
| 5,961,160 A * | 10/1999 | Frohlich | 285/342 |
| 6,168,211 B1 * | 1/2001 | Schorn-Gilson | 285/348 |
| 6,431,613 B1 * | 8/2002 | Altenrath et al. | 285/354 |
| 6,527,304 B1 * | 3/2003 | Pliassounov | 285/334.5 |
| 7,000,953 B2 * | 2/2006 | Berghaus | 285/354 |
| 7,350,831 B2 * | 4/2008 | Shimizu | 285/334.5 |
| 7,467,811 B2 * | 12/2008 | Frasch et al. | 285/13 |
| 7,490,867 B2 * | 2/2009 | Ehrke | 285/354 |
| 2002/0101079 A1 * | 8/2002 | Ehrke | 285/354 |
| 2005/0023832 A1 * | 2/2005 | Edler | 285/354 |
| 2005/0134043 A1 * | 6/2005 | Staniszewski et al. | 285/334.5 |
| 2007/0024054 A1 * | 2/2007 | Ko | 285/354 |

FOREIGN PATENT DOCUMENTS

| | | |
|---|---|---|
| JP | H02-37015 | 10/1990 |
| JP | 06235484 A * | 8/1994 |

* cited by examiner

CONNECTING MECHANISM FOR THIN STAINLESS STEEL PIPE AND JOINT

CROSS-REFERENCE TO RELATED APPLICATION

This application is a continuation that claims the benefit of and priority to PCT Application No. JP2007/70485, filed Oct. 19, 2007.

BACKGROUND OF THE INVENTION

1. Field of the Invention

This invention relates to a connecting mechanism for a thin stainless steel pipe and a joint which can simply and securely connect the thin stainless steel pipe and the joint in the field and can easily know a flaw of a coupling work.

2. Description of the Related Art

This kind of related art includes a structure disclosed in Japanese Utility Model Publication No. 2-37015 (patent document 1) which has been proposed by the applicant of the present application in advance. When describing based on FIG. 10 showing a connecting structure for a thin stainless steel pipe and a joint which is obtained by further adding an improvement to this related art, this related art is constructed by a thin stainless steel pipe 1 in which a chevron type projection portion 5 having two inclined surfaces 5a and 5b is formed in an outer periphery of an end portion, a joint 2 in which a male thread portion 7 is formed in an outer peripheral surface of an end portion as well as having an inner diameter to which the thin stainless steel pipe 1 is inserted, a nut 4 which has a female thread portion 8 engaging with the male thread portion 7 of the joint 2 as well as having a fitting portion 11 outwardly fitted to the thin stainless steel pipe 1 so as to oppose to the joint 2 on the boundary of the chevron type projection portion 5, and a packing 3 which is provided between the joint 2 and the thin stainless steel pipe 1.

In the joint 2, there is formed a packing fitting portion 6 for fitting the packing 3 closely attached to one inclined surface 5b close to the end portion of the chevron type projection portion 5 to an inner periphery close to an open end portion 2a thereof. Further, a pipe insertion hole 2d expanded at a thickness of the thin stainless steel pipe 1 for inserting an end portion of the thin stainless steel pipe 1 is formed in both ends of an inner hole 2c in a center portion.

In the nut 4, there is formed an inclined notch portion 10 closely attached to the other inclined surface 5a of the chevron type projection portion 5 in an inner end portion of the fitting portion 11 outwardly fitted to the thin stainless steel pipe 1, and there is formed a joint contact surface 9 with which the opening end portion 2a of the joint 2 is brought into contact at a time of screwing and firmly attaching the female thread portion 8 of the nut 4 and the male thread portion 7 of the joint 2. The joint contact surface 9 is formed based on an inner diameter difference between the fitting portion 11 and the female thread portion 8.

The packing 3 is formed in such a manner as to be closely attached to each of the one inclined surface 5b of the chevron type projection portion 5 formed in the thin stainless steel pipe 1 a time of screwing and firmly attaching the female thread portion 8 of the nut 4 and the male thread portion 7 of the joint 2, the joint contact surface 9 of the nut 4, and a packing pressing surface 6a and a packing outer peripheral contact surface 6b corresponding to an inner side surface of the packing fitting portion 6 of the joint 2, and is made of an elastic material such as a rubber or the like having an approximately polygonal horizontal cross sectional shape.

The chevron type projection portion 5 of the thin stainless steel pipe 1 is formed by using a pipe expanding apparatus K, as shown in FIG. 11, and is formed specifically in accordance with the following procedure. First of all, the female thread portion 8 of the nut 4 outwardly fitted to the thin stainless steel pipe 1 is screwed and firmly attached to a male thread portion 21 formed in an outer periphery of a pipe expanding head 20 fixed to an apparatus (not shown), a shaft 25 outwardly fitting a rubber receiver 22, a pipe expanding rubber 23 and a rubber presser foot 24 is movably inserted from an end portion of the thin stainless steel pipe 1, and a leading end of the thin stainless steel pipe 1 is inserted from an opening portion of the pipe expanding head 20 until it comes into contact with a step wall 20a in an inner portion thereof. Further, the rubber receiver 22 is brought into contact with the step wall 20a of the pipe expanding head 20 by pulling the shaft 25 by an apparatus (not shown) in an arrow direction, and the shaft 25 is pulled in the arrow direction, whereby the rubber presser foot 24 is pushed in the arrow direction by a locking portion 26 fixed to a leading end of the shaft 25. At this time, since the pipe expanding rubber 23 pinched by the rubber receiver 22 and the rubber presser foot 24 is reduced its width, the pipe expanding rubber 23 is expanded at a volume reduced in a circumferential direction. In an outer periphery of the expanded pipe expanding rubber 23, the thin stainless steel pipe 1 is evaginated to a chevron space U in an end portion thereof in accordance with the expansion in the circumferential direction of the pipe expanding rubber 23, as shown in FIG. 12, based on an existence of the chevron space U formed by the inclined notch portion 10 of the nut 4 and a notch portion 20b formed in an inner peripheral surface of a leading end of the pipe expanding head 20, whereby the chevron type projection portion 5 is formed. The nut 4 is loosened in this state so as to be detached from the pipe expanding head 20, and there is set a state in which the nut 4 is fitted to an outer periphery of the thin stainless steel 1. The shaft 25, and the rubber receiver 22, the pipe expanding rubber 23 and the rubber presser foot 24 which are outwardly fitted to the shaft 25 are drawn out from the thin stainless steel pipe 1.

The connection between the thin stainless steel pipe 1 and the joint 2 is achieved first of all by fitting the packing 3 from the end portion of the thin stainless steel pipe 1 so as to closely attach the fitted packing 3 to the one inclined surface 5a, or fitting the packing 3 into the packing fitting portion 6 of the joint 2 and thereafter inserting the end portion of the thin stainless steel pipe 1 to the inner portion of the pipe insertion hole 2d existing in both sides of the joint 2, as shown in a right half of FIG. 10. Further, the male thread portion 7 formed in the outer periphery of the end portion of the joint 2 is connected to the female thread portion 8 of the nut 4 outwardly fitted to the thin stainless steel pipe 1 by turning the nut sufficiently in advance until the joint contact surface 9 comes into contact with the opening end portion 2a of the joint 2 in a fastening manner. Accordingly, as shown in a left half of FIG. 10, the chevron type projection portion 5 of the thin stainless steel pipe 1 is pinched by the corner portion 2b of the joint 2, the inclined notch portion 10 of the nut 4 and the packing 3 so as to be fixed, and the packing 3 is closely attached to the inclined surface 5b of the chevron type projection portion 5, the packing pressing surface 6a and the packing outer peripheral contact surface 6b corresponding to the inner side surface of the packing fitting portion 6, and the joint contact surface 9, thereby preventing the leakage of water leaking out from the gap of the connection portion between the thin stainless steel pipe 1 and the joint 2.

DETAILED DESCRIPTION OF THE PREFERRED EMBODIMENTS

Figure 1:
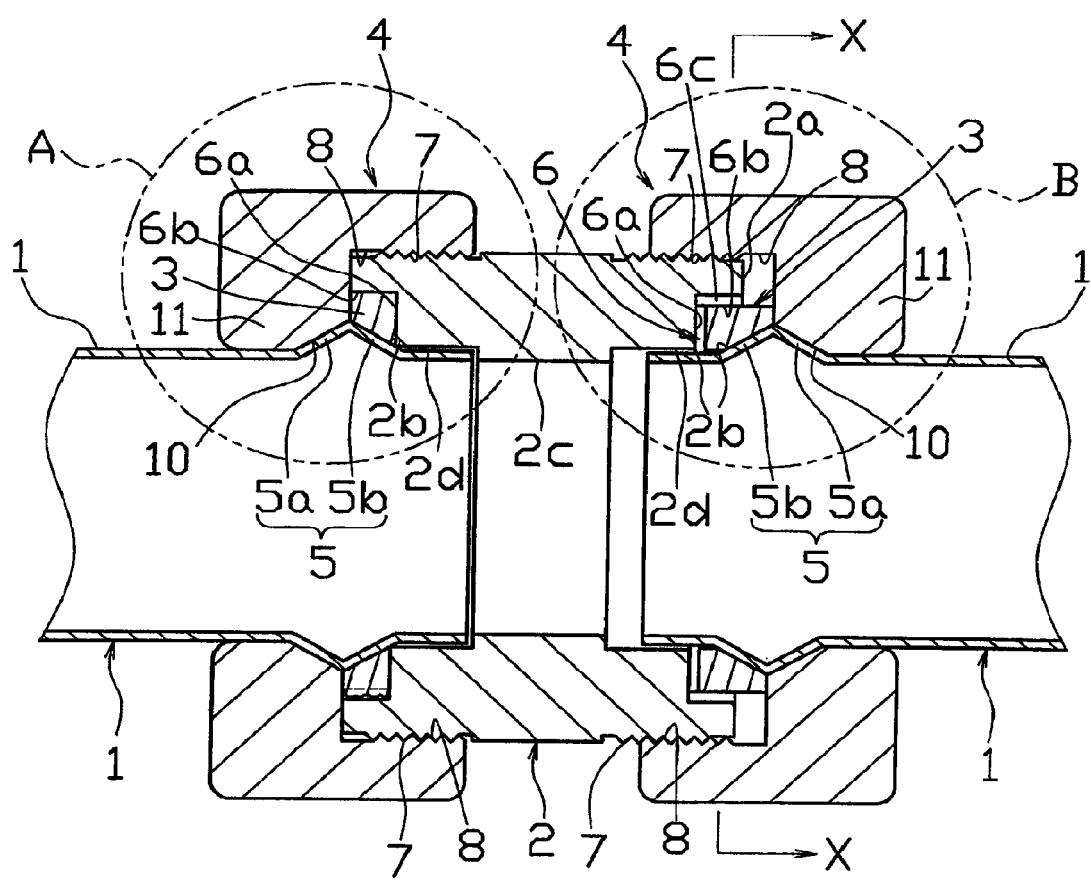
FIG. 1 is a schematic vertical cross sectional view showing a coupling structure of a thin stainless steel pipe using a pipe joint in accordance with a first embodiment of the present invention.
Figure 2:
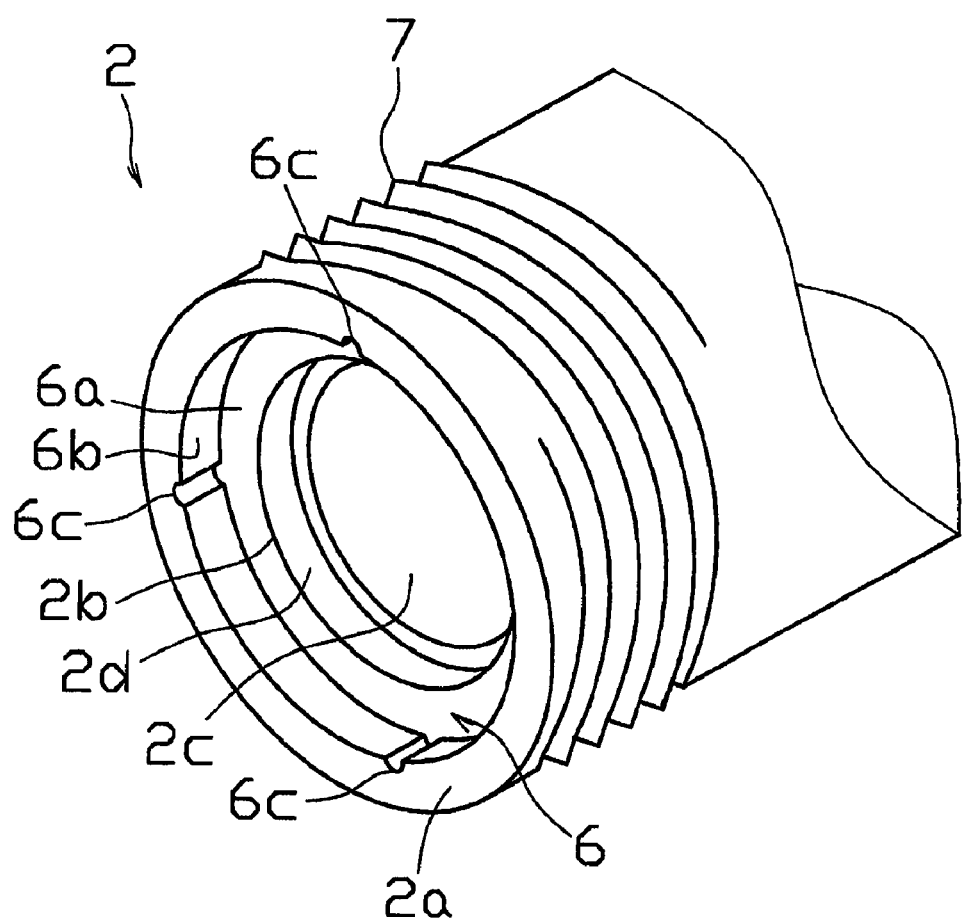
FIG. 2 is a schematic perspective view showing a structure of one end side of the pipe joint in accordance with the first embodiment.
Figure 3:
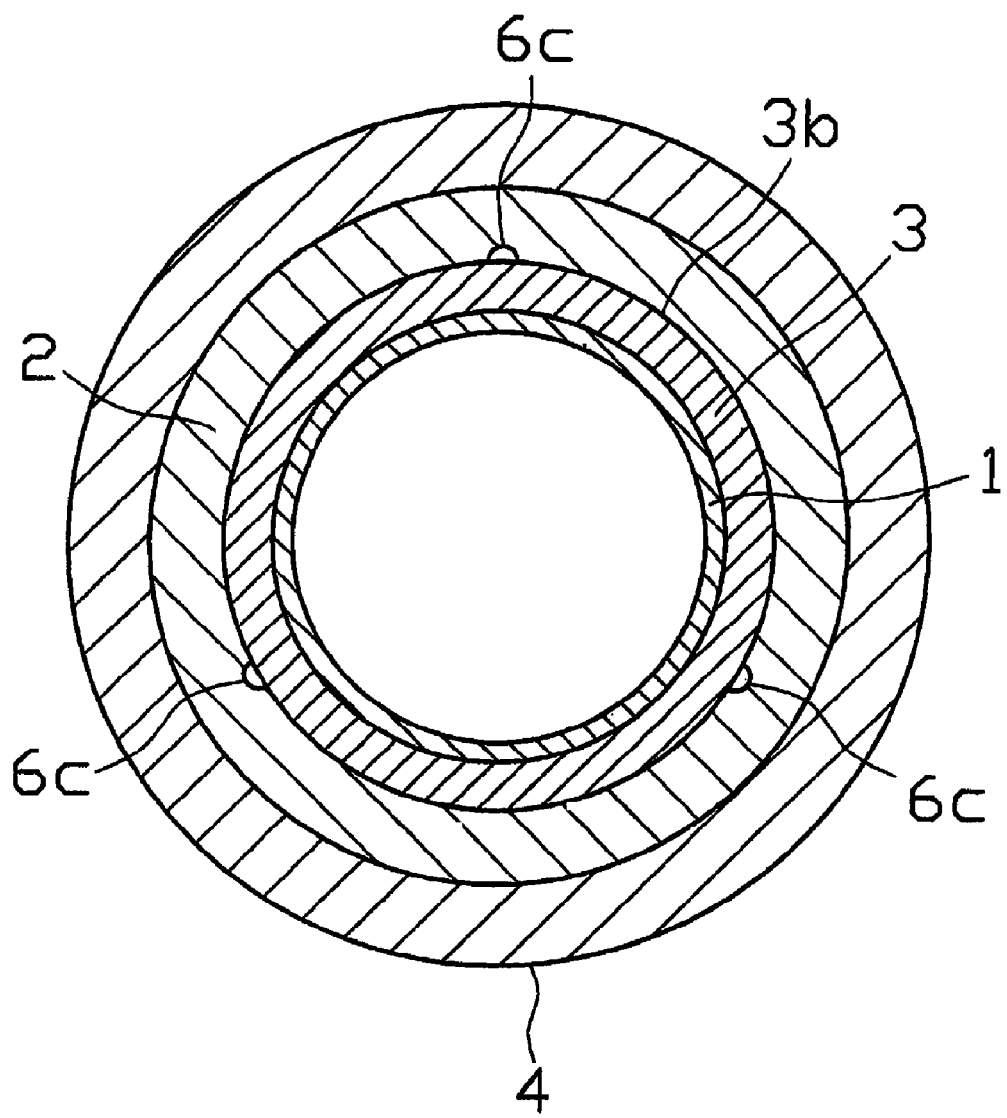
FIG. 3 is a vertical cross sectional view along a line X-X in FIG. 1.
Figure 4:
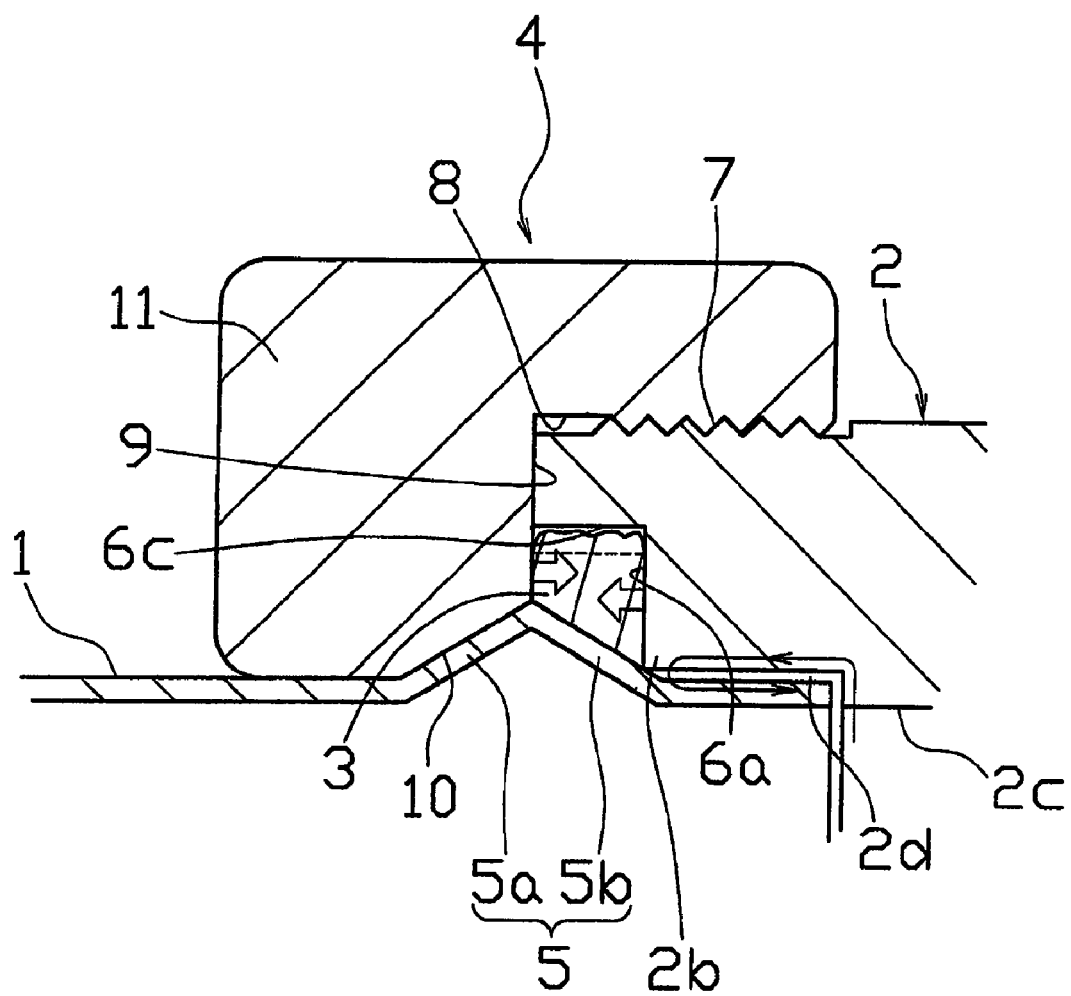
FIG. 4 is a partial enlarged vertical cross sectional view of a portion A in FIG. 1.

In accordance with the related art mentioned above, since it is hard to discriminate from an outer side even in a case where the female thread 8 of the nut 4 is not sufficiently fastened to the male thread 7 of the joint 2 such as a temporal fastening by a manual fastening having a weak fastening force at a time of a piping execution, this matter is often passed over at a time of inspecting a construction finish. Further, a water leak is checked by tentatively circulating a pressure water after the end of the piping construction, however, since the packing 3 is closely attached to the joint 2 and the inclined surface 5b of the thin stainless steel pipe 2 even in the manual fastening stage, the water is not so leaked, so that this matter is often passed over. Due to the reason mentioned above, if the nut 4 is started to use in a state where the nut 4 is not sufficiently fastened to the joint 2, which causes a problem that the connection between the nut 4 and the joint 2 is detached, and the water leak of the fluid such as the water flowing within the thin stainless steel pipe 1 or the like simultaneously arises, whereby a portion within a building is soiled.

This invention is made for solving the problem mentioned above, and an object of this invention is to provide a connecting mechanism for a thin stainless steel pipe and a joint which can check out a fastening failure and an insufficient fastening at a time of a piping execution for screwing and firmly attaching a male thread portion of a joint to a female thread portion of a nut fitted to a thin stainless steel pipe, based on a leakage of a pressure water.

In order to achieve the object mentioned above, in accordance with the present invention, there is provided a connecting mechanism for a thin stainless steel pipe and a joint, including: a thin stainless steel pipe in which a chevron type projection portion is formed in an outer periphery of an end portion; a joint having an inner diameter inserting the thin stainless steel pipe and forming a male thread portion in an outer peripheral surface of an end portion; a nut having a fitting portion outwardly fitted to the thin stainless steel pipe so as to oppose to the joint on the boundary of the chevron type projection portion and having a female thread portion screwed to the male thread portion of the joint; a packing provided between the joint and the thin stainless steel pipe; and a chevron type projection portion having two inclined surfaces being formed by expanding the chevron type projection portion of the thin stainless steel pipe based on a uniform force by inflating a rubber inserted to an inner portion of the chevron type projection portion in an outer peripheral direction, a packing fitting portion fitting the packing to an inner periphery of an end portion of the joint being formed in the joint, an inclined notch portion closely attached ton one inclined surface of the chevron type projection portion being formed in an inner end portion of a fitting portion of the nut, a joint contact surface being formed in the nut, the joint contact surface being structured such that an end surface of the joint is brought into contact with the joint contact surface at a time when the female thread portion of the nut and the male thread portion of the joint are screwed and firmly attached, and the joint contact surface is formed based on an inner diameter difference between the fitting portion and the female thread portion, and the packing being formed such as to be closely attached to each of another inclined surface of the chevron type projection portion formed in the thin stainless steel pipe, and a packing pressing surface and a packing outer peripheral contact surface constructing inner side surfaces of the joint contact surface of the nut and the packing fitting portion of the joint at a time when the female thread portion of the nut is screwed and firmly attached to the male thread portion of the joint, wherein a release groove is formed in a packing outer peripheral contact surface from the packing pressing surface constructing the inner side surface of the packing fitting portion of the joint to an opening end portion.

Further, in accordance with the present invention, there is provided a connecting mechanism for a thin stainless steel pipe and a joint, including: a thin stainless steel pipe in which a chevron type projection portion is formed in an outer periphery of an end portion; a joint having an inner diameter inserting the thin stainless steel pipe and forming a male thread portion in an outer peripheral surface of an end portion; a nut having a fitting portion outwardly fitted to the thin stainless steel pipe so as to oppose to the joint on the boundary of the chevron type projection portion and having a female thread portion screwed to the male thread portion of the joint; a packing provided between the joint and the thin stainless steel pipe; and a chevron type projection portion having two inclined surfaces being formed by expanding the chevron type projection portion of the thin stainless steel pipe based on a uniform force by inflating a rubber inserted to an inner portion of the chevron type projection portion in an outer peripheral direction, a packing fitting portion fitting the packing to an inner periphery of an end portion of the joint being formed in the joint, an inclined notch portion closely attached ton one inclined surface of the chevron type projection portion being formed in an inner end portion of a fitting portion of the nut, a joint contact surface being formed in the nut, the joint contact surface being structured such that an end surface of the joint is brought into contact with the joint contact surface at a time when the female thread portion of the nut and the male thread portion of the joint are screwed and firmly attached, and the joint contact surface is formed based on an inner diameter difference between the fitting portion and the female thread portion, and the packing being formed such as to be closely attached to each of another inclined surface of the chevron type projection portion formed in the thin stainless steel pipe, and a packing pressing surface and a packing outer peripheral contact surface constructing inner side surfaces of the joint contact surface of the nut and the packing fitting portion of the joint at a time when the female thread portion of the nut is screwed and firmly attached to the male thread portion of the joint, wherein a projection is formed in a packing outer peripheral contact surface from the packing pressing surface constructing the inner side surface of the packing fitting portion of the joint to an opening end portion.

In accordance with the connecting mechanism for the thin stainless steel and the joint based on the first aspect of the present invention, the water intruding into a space generated between the packing pressing surface of the packing fitting portion and the packing passes through the release groove formed in the packing outer peripheral contact surface via the gap between the joint and the thin stainless steel pipe at a position at which the fastening of the nut is insufficient, even in a state in which the outer peripheral surface of the packing is brought into contact with the packing outer peripheral contact surface of the packing fitting portion, thereby leaking out to the external portion from the screwed portion between the nut and the joint or the joint portion between the nut and the thin stainless steel pipe. On the other hand, at a position at which the nut is sufficiently fastened, since the packing pressing surface of the packing fitting portion of the joint presses the packing against the joint contact surface of the nut and the inclined surface of the thin stainless steel pipe so as to stop water, the water in the thin stainless steel pipe does not leak out to the external portion. Further, even if a small space is generated between the packing pressing surface of the packing fitting portion and the packing and the water intrudes thereinto, the packing compressed by fastening the nut evaginates from the packing fitting portion and the release groove is filled up. Accordingly, no water leaks out to the external portion through the release groove. As mentioned above, it is possible to securely find out the position at which the fastening of the nut is insufficient, by circulating the pressure water to the thin stainless steel pipe so as to specify the position at which the water leak is generated. Further, it is preferable to fasten the nut at which the water leaks out.

Further, in accordance with the connecting mechanism for the thin stainless steel and the joint based on the second aspect of the present invention, the gap corresponding to the height of the projection is generated between the outer peripheral surface of the packing and the packing outer peripheral contact surface constructing the inner side surface of the packing fitting portion, at a position at which the fastening of the nut is insufficient. Accordingly, the water intruding into a space generated between the packing pressing portion of the packing fitting portion projection and the packing passes through the gap corresponding to the height of the projection via the gap between the joint and the thin stainless steel pipe, thereby leaking out to the external portion from the screwed portion between the nut and the joint or the joint portion between the nut and the thin stainless steel pipe. On the other hand, at a position at which the nut is sufficiently fastened, since the packing pressing surface of the packing fitting portion of the joint presses the packing against the joint contact surface of the nut and the inclined surface of the thin stainless steel pipe so as to stop water, the water in the thin stainless steel pipe does not leak out to the external portion. Further, even if a small space is generated between the packing pressing surface of the packing fitting portion and the packing and the water intrudes thereinto, the packing compressed by fastening the nut is deformed, whereby the gap corresponding to the height of the projection is filled up with the packing. Accordingly, no water leaks out to the external portion through the gap. As mentioned above, it is possible to securely find out the position at which the fastening of the nut is insufficient, by circulating the pressure water to the thin stainless steel pipe so as to specify the position at which the water leak is generated. Further, it is preferable to fasten the nut at which the water leaks out.

A description will be given below of a preferred embodiment of this invention. This invention is different from the related art in a point that a joint 2 is improved in such a manner that a water leak is generated in a case where a fastening of a nut 4 is insufficient at a time of coupling a thin stainless steel pipe 1 via the joint 2 and a packing 3 by the nut 4. Since the other constituting elements are the same as the related art, a description thereof will be omitted by attaching the same reference numerals.

The joint 2 forms a corner portion 2*b* and a packing fitting portion 6, which are brought into contact with the other inclined surface 5*b* of a chevron type projection portion 5 of the thin stainless steel pipe 1, in an inner periphery close to an opening end portion 2*a* of the joint 2, as shown in FIGS. 1 to 6. The packing fitting portion 6 has two inner side surfaces including a packing pressing surface 6*a* with which a leading end surface 3*a* of the packing 3 is brought into contact, and a packing outer peripheral contact surface 6*b* with which an outer peripheral surface 3*b* of the packing 3 is brought into contact, as is well expressed in FIGS. 5 and 6. Further, a release groove 6*c* is formed in an axial direction of the packing outer peripheral contact surface 6*b*, from the packing pressing surface 6*a* to the opening end portion 2*a* of the joint 2. The release groove 6*c* is provided for leading water existing in a gap in the packing pressing surface 6*a* and the leading end surface 3*a* of the packing 3 to a gap S3 formed by a joint contact surface 9 of the nut 4 and the opening end portion 2*a* of the joint 2, and a part of the packing 3 enters the release groove 6*c* at a time when the packing 3 is pinched between the packing pressing surface 6*a* and the joint contact surface 9 of the nut 4 so as to evaginate in a circumferential direction, so that the release groove 6*c* is sealed. The number of the release groove 6*c* is not particularly limited. In a case where a plurality of release grooves 6*c* are provided, it is preferable to provide the release groove c at a uniform interval. Further, a magnitude of a width of the release groove 6*c* is not particularly limited, however, if the magnitude is too small, the evaginating packing 3 is hard to enter and can not seal the groove. Accordingly, the width equal to or more than 1 mm is necessary. Further, if a depth of the groove is too deep, the evaginating packing 3 is hard to enter. Accordingly, it is preferable that the depth of the groove is equal to or less than one quarter a thickness of the packing 3. However, they are decided individually in relation to the width of the groove.

Figure 5:
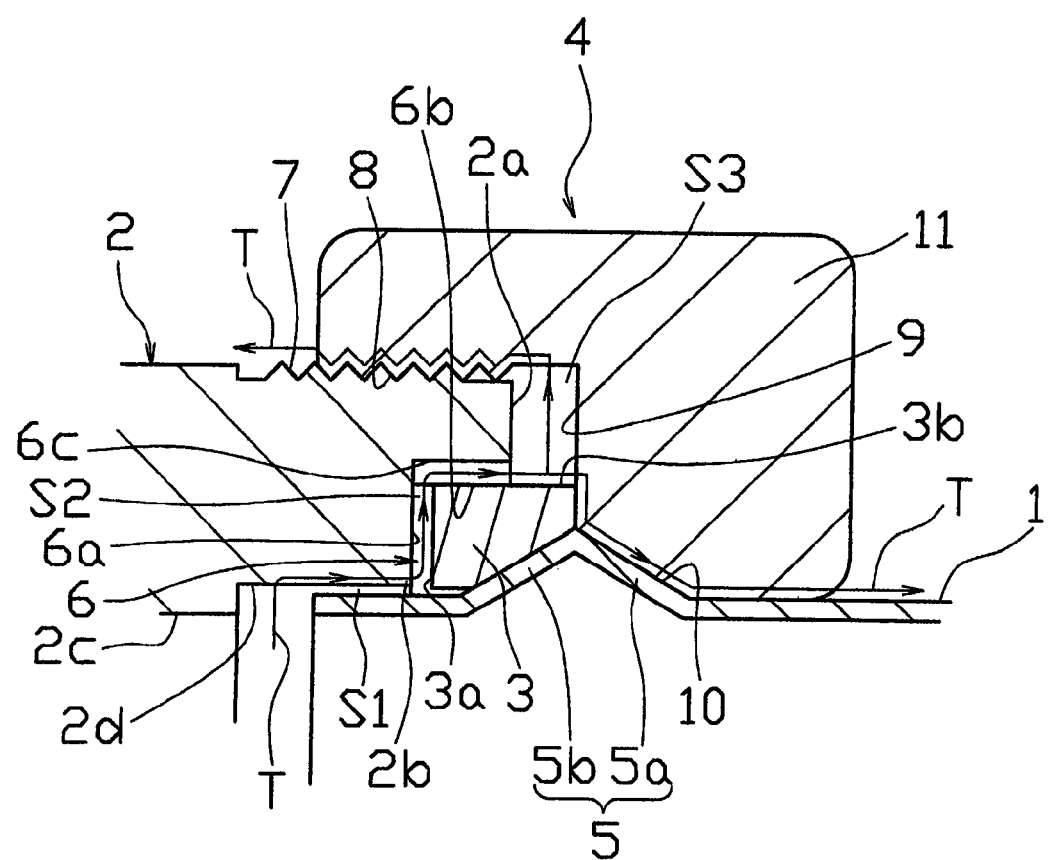
FIG. 5 is a partial enlarged vertical cross sectional view of a portion B in FIG. 1.

If a female thread 8 of the nut 4 and a male thread 7 of the joint 2 are not sufficiently fastened in a temporary fastened state, as shown in FIG. 5, the water flowing in an inner hole 2*c* of the joint 2 enters the gap S3 formed by the opening end portion 2*a* of the joint 2 and the joint contact surface 9 of the nut 4 through the release groove 6*c* via a gap S2 between the packing pressing surface 6*a* of the packing fitting portion 6 and the leading end surface 3*a* of the packing 3 from a gap S1 between a pipe insertion hole 2*d* of the joint 2 and the thin stainless steel pipe 1, and leaks out to an external portion of the thin stainless steel pipe 1 through a small gap between the female thread 8 and the male thread 7, and small gaps between the joint contact surface 9 of the nut 4 and an inclined notch portion 10 and between the packing 3 and the inclined surface 5a from the gap S3. A passing path of the water at this time is shown by an arrow T in FIG. 5. Accordingly, it is possible to check out from the external portion that the fastening between the nut 4 and the joint 2 is insufficient, in this connecting mechanism.

Figure 6:
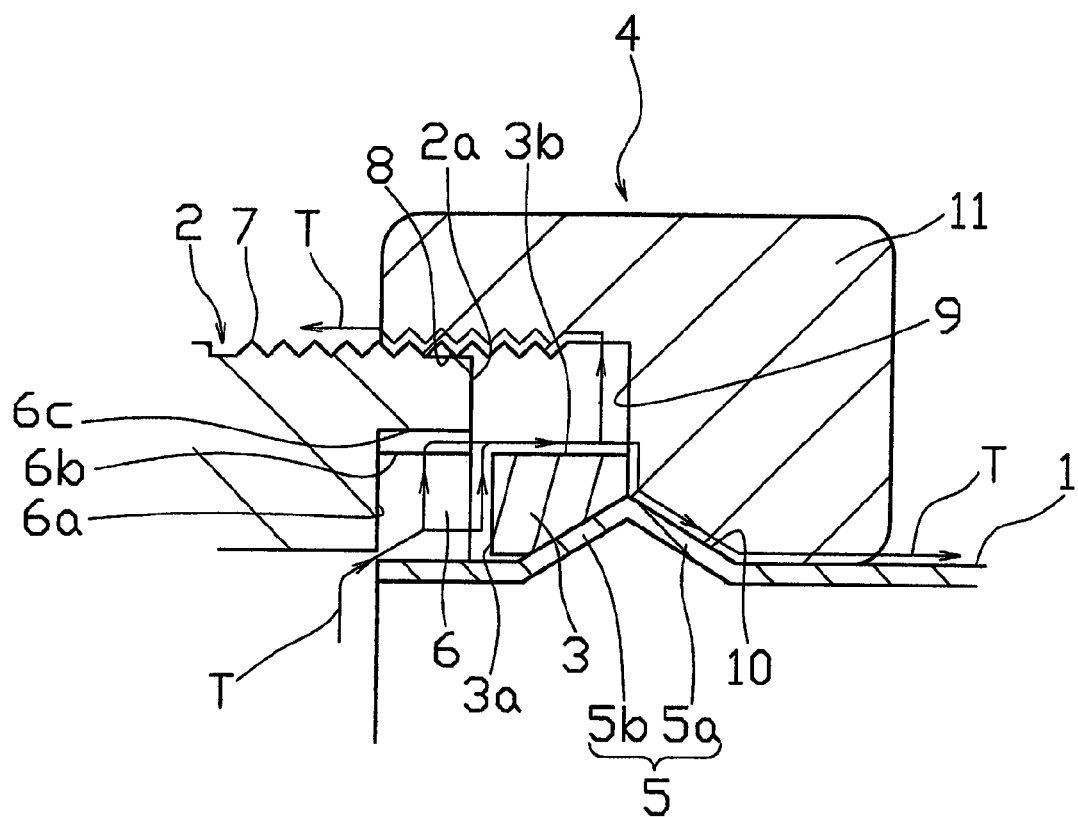
FIG. 6 is a partial enlarged vertical cross sectional view in a case where a fastening is further insufficient in comparison with the portion B in FIG. 1.

FIG. 6 shows a case where the fastening between the female thread 8 of the nut 4 and the male thread 7 of the joint 2 is further slack. In this case, since the water passing path of the arrow T shown in FIG. 5 is enlarged, the water widely leaks out to the external portion, and it is possible to easily check out from the external portion that the fastening is insufficient.

Figure 7:
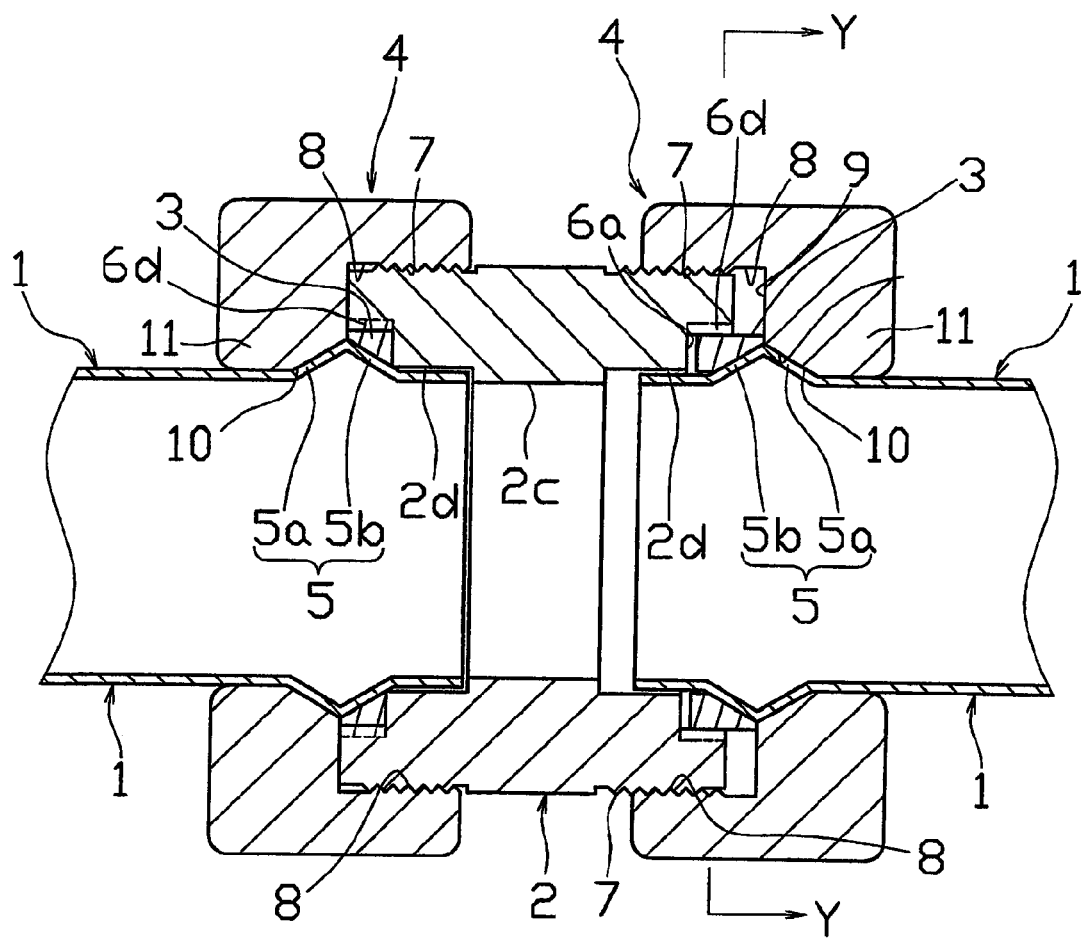
FIG. 7 is a schematic vertical cross sectional view showing a coupling structure of a pipe using a pipe joint in accordance with a second embodiment of the present invention.
Figure 8:
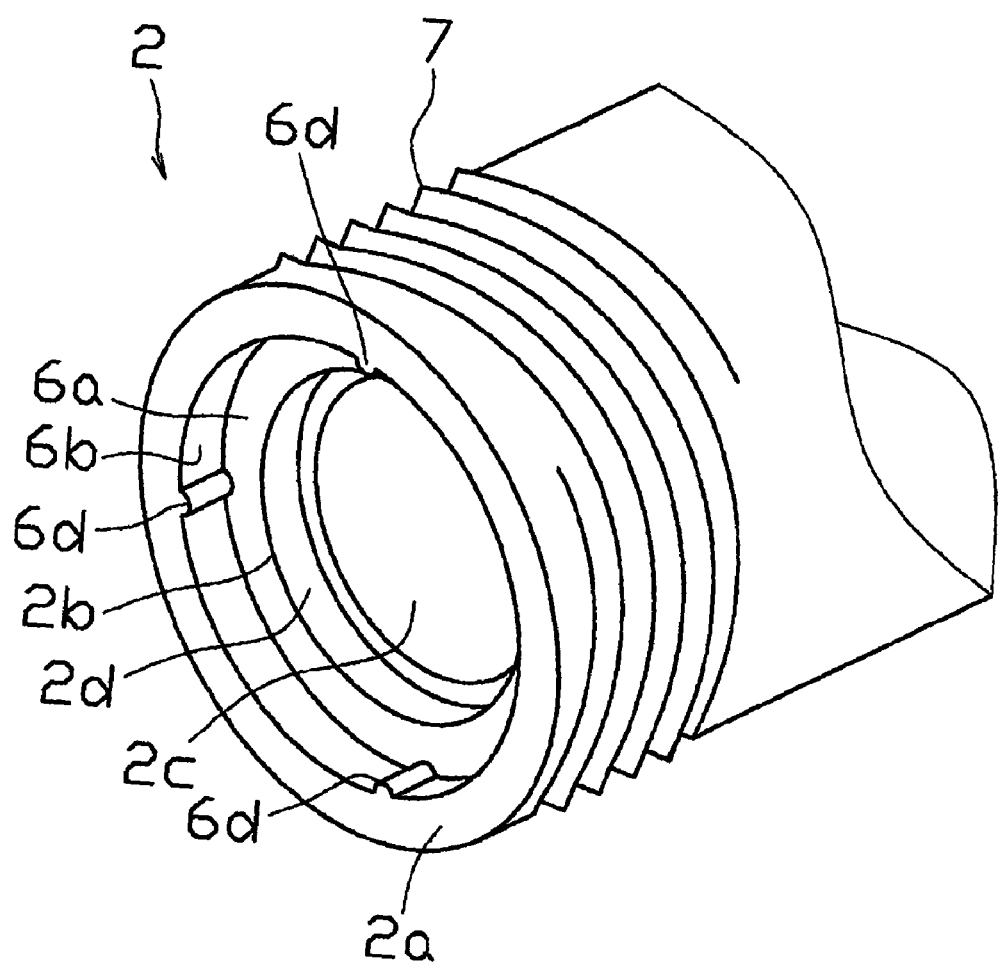
FIG. 8 is a schematic perspective view showing a structure of one end side of the pipe joint in accordance with the second embodiment.
Figure 9:
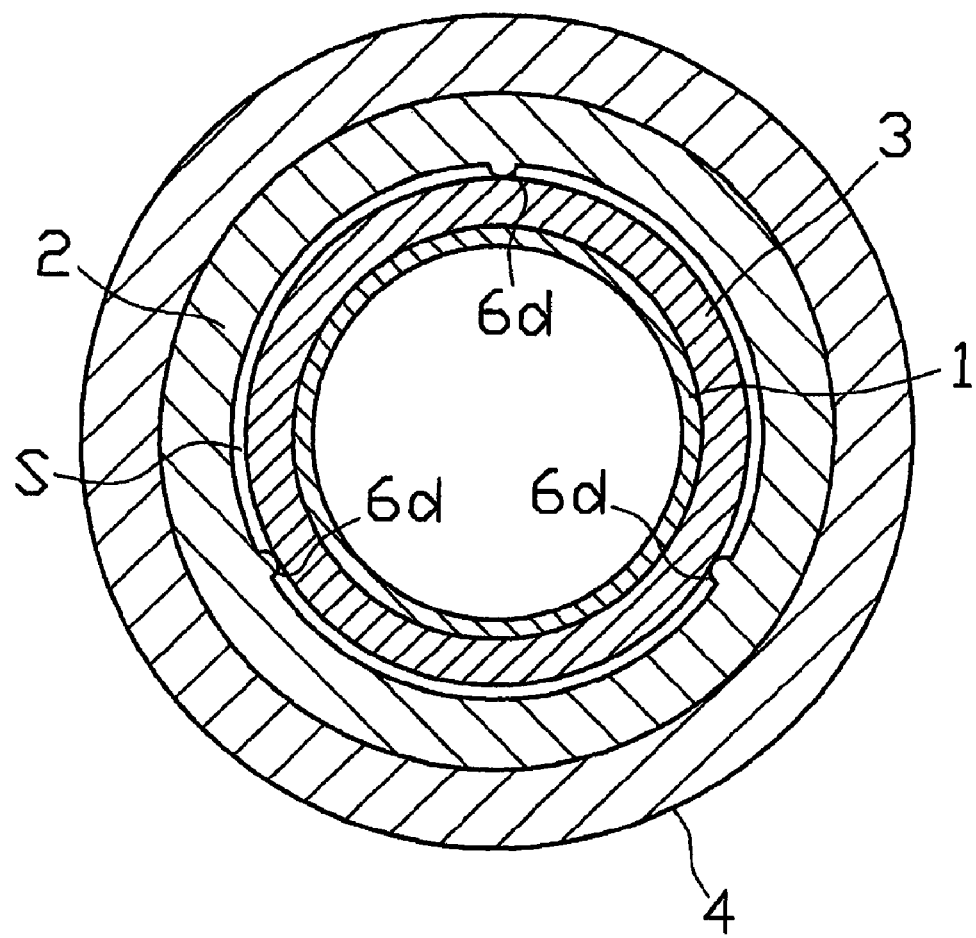
FIG. 9 is a vertical cross sectional view along a line Y-Y in FIG. 7.
Figure 10:
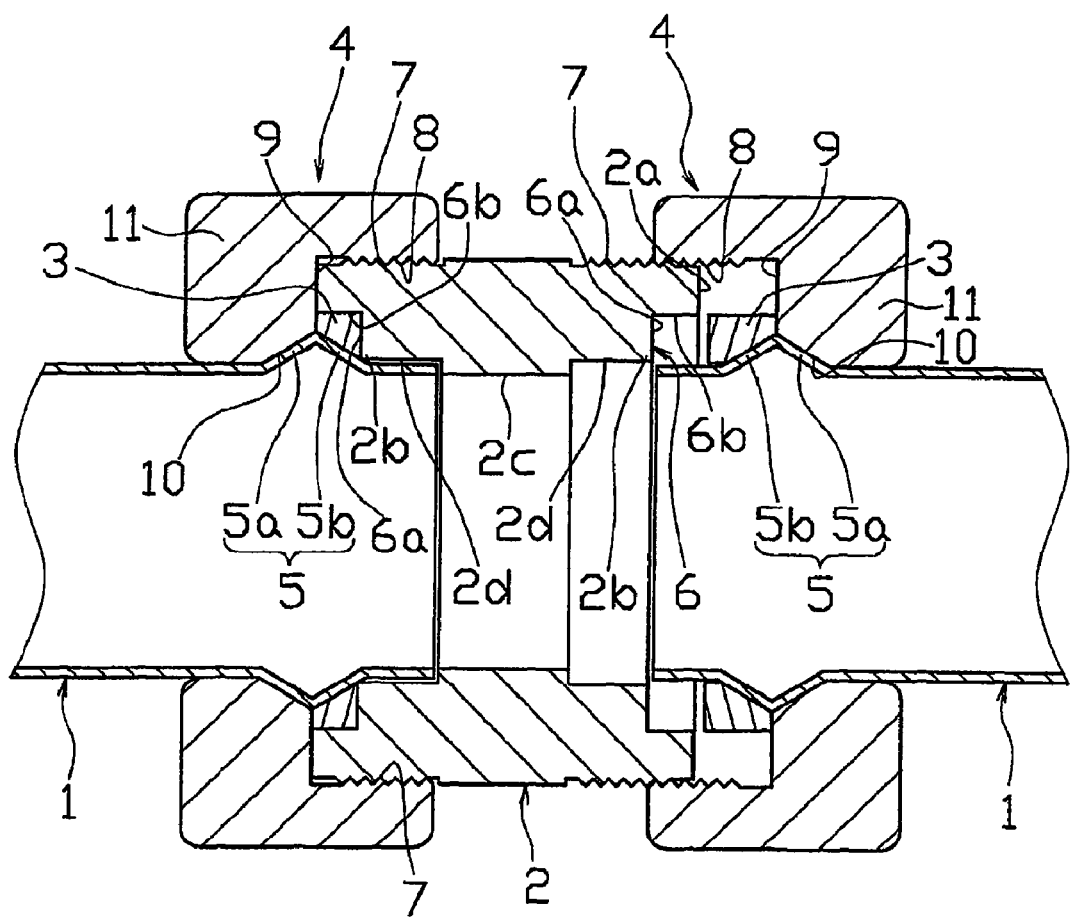
FIG. 10 is a schematic vertical cross sectional view showing a coupling structure of a thin stainless steel pipe using a pipe joint in accordance with a related art.
Figure 11:
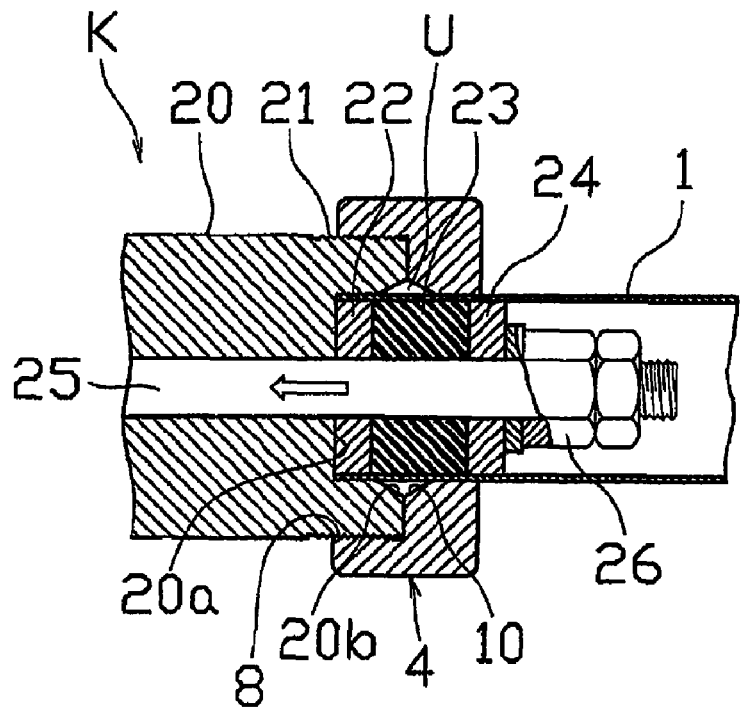
FIG. 11 is an explanatory view forming a chevron type projection portion in a thin stainless steel pipe.
Figure 12:
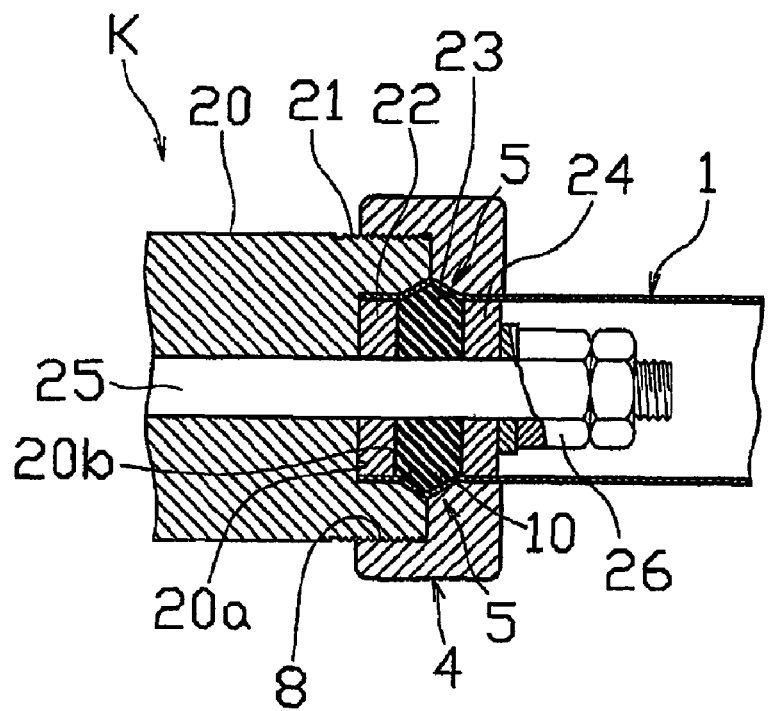
FIG. 12 is an explanatory view forming the chevron type projection portion in the thin stainless steel pipe.

A description will be given of a second embodiment in accordance with this invention with reference to FIGS. 7 to 9. The second embodiment is different from the first embodiment in a point that a projection 6d is formed in place of the release groove 6c in the packing outer peripheral contact surface 6b. A gap S is formed between the outer peripheral surface 3b of the packing 3 and the packing outer peripheral contact surface 6b by this projection 6d. If the female thread 8 of the nut 4 is sufficiently fastened to the male thread 7 of the joint 2, the packing 3 is pinched by the joint contact surface 9 of the nut 4 and the packing pressing surface 6a of the joint 2, a volume corresponding to a reduced amount evaginates in an outer peripheral direction, and the gap S is filled. Accordingly, since the water flowing within the thin stainless steel pipe 1 is closed in its passing path, no water leaks out.

The number of the projection 6d is not particularly limited, however, the packing 3 existing in an inner portion is stably supported by three or more projections. Further, it is desirable that a length of the projection 6d is formed along an entire length in an axial direction of the packing outer peripheral contact surface 6b, however, it is not always necessary to form one continuous projection, but small projections are formed on display so as to be spaced. If a protruding height of the projection 6d is too large, there is a risk that the gap can not be closed by the evagination of the packing 3. Accordingly, it is preferable that the protruding height is equal to or less than one quarter the thickness of the packing 3.

In the connection between the thin stainless steel pipe 1 and the joint 2, first of all, the packing 3 is pressed into the packing fitting portion 6 of the joint 2, and the end portion of the thin stainless steel pipe 1 is thereafter inserted to the inner portion of the pipe insertion hole 2d of the joint 2. Further, it may screw the male thread 7 formed in the outer periphery of the end portion of the joint 2 and the female thread portion 8 of the nut 4 which is outwardly fitted to the thin stainless steel pipe 1 in advance until the joint contact surface 9 of the nut 4 is brought into contact with the end portion of the joint 2. Accordingly, the chevron type projection portion 5 of the thin stainless steel pipe 1 is pinched by the corner portion 2b of the joint 2, the inclined notch portion 10 of the nut 4 and the packing 3 so as to be fixed, and the packing 3 is closely attached to the other inclined surface 5b of the chevron type projection portion 5, the packing fitting portion 6b and the joint contact surface 9, thereby preventing the leakage of the fluid flowing within the thin stainless steel pipe 1. Since the case where the fastening is insufficient is the same as the first embodiment, a description thereof will be omitted.

INDUSTRIAL APPLICABILITY

This invention can be effectively utilized with respect to a piping such as a water pipe or the like frequently arranged in each of floors of a building.

What is claimed is:

1. A connecting mechanism for a thin stainless steel pipe and a joint, comprising:
   the thin stainless steel pipe in which a chevron type projection is formed on an outer periphery of an end portion;
   the joint having an inner diameter configured to allow said thin stainless steel pipe to be inserted thereinto, and having a male thread portion formed in an outer peripheral surface of an end portion;
   a nut having a fitting portion outwardly fitted to said thin stainless steel pipe so as to oppose said chevron type projection and having a female thread portion screwed to the male thread portion of the joint; and
   a packing provided between said joint and said thin stainless steel pipe;
   the chevron type projection of said thin stainless steel pipe having two inclined surfaces being formed by expanding a portion of said thin stainless steel pipe with a uniform force caused by inflating in an outer peripheral direction a rubber inserted within said portion of said thin stainless steel pipe portion, a packing fitting portion being formed in said joint and fitting said packing to an inner periphery of an end portion of the joint, an inclined notch portion being formed in an inner end portion of a fitting portion of said nut and being closely attached to one inclined surface of said chevron type projection portion, a joint contact surface being formed in said nut, the joint contact surface being structured such that an end surface of the joint is brought into contact with the joint contact surface at a time when the female thread portion of said nut and the male thread portion of the joint are screwed and firmly attached, and the joint contact surface is defined by an inner diameter difference between said fitting portion and the female thread portion, and said packing being formed such as to be closely attached to each of another inclined surface of the chevron type projection portion formed on said thin stainless steel pipe, and a packing pressing surface and a packing outer peripheral contact surface defining inner side surfaces of the packing fitting portion of the joint as set by the joint contact surface of the nut at a time when the female thread portion of said nut is screwed and firmly attached to the male thread portion of said joint,
   wherein a release groove is formed in the packing outer peripheral contact surface and extends from the packing pressing surface to an opening end portion of said joint.

2. A connecting mechanism for a thin stainless steel pipe and a joint, comprising:
   the thin stainless steel pipe in which a chevron type projection is formed on an outer periphery of an end portion;
   the joint having an inner diameter for allowing said thin stainless steel pipe to be inserted thereinto, and having a male thread portion formed in an outer peripheral surface of an end portion;
   a nut having a fitting portion outwardly fitted to said thin stainless steel pipe so as to oppose said chevron type projection and having a female thread portion screwed to the male thread portion of the joint; and
   a packing provided between said joint and said thin stainless steel pipe;
   the chevron type projection of said thin stainless steel pipe having two inclined surfaces being formed by expanding a portion of said thin stainless steel pipe with a uniform force caused by inflating in an outer peripheral direction a rubber inserted within said portion of said thin stainless steel pipe portion, a packing fitting portion being formed in said joint and fitting said packing to an inner periphery of an end portion of the joint, an inclined notch portion being formed in an inner end portion of a fitting portion of said nut and being closely attached to one inclined surface of said chevron type projection portion, a joint contact surface being formed in said nut, the joint contact surface being structured such that an end surface of the joint is brought into contact with the joint contact surface at a time when the female thread portion of said nut and the male thread portion of the joint are screwed and firmly attached, and the joint contact surface is defined by an inner diameter difference between said fitting portion and the female thread portion, and said packing being formed such as to be closely attached to each of another inclined surface of the chevron type projection portion formed on said thin stainless steel pipe, and a packing pressing surface and a packing outer peripheral contact surface defining inner side surfaces of the packing fitting portion of the joint as set by the joint contact surface of the nut at a time when the female thread portion of said nut is screwed and firmly attached to the male thread portion of said joint, wherein a projection is formed in the packing outer peripheral contact surface and extends from the packing pressing surface to an opening end portion of said joint.

* * * * *